US008528063B2

(12) United States Patent
Duggan et al.

(10) Patent No.: US 8,528,063 B2
(45) Date of Patent: Sep. 3, 2013

(54) CROSS DOMAIN SECURITY INFORMATION CONVERSION

(75) Inventors: Matthew Paul Duggan, Austin, TX (US); Dolapo Martin Falola, Austin, TX (US); Patrick Ryan Wardrop, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 3097 days.

(21) Appl. No.: 10/815,213

(22) Filed: Mar. 31, 2004

(65) Prior Publication Data

US 2005/0223413 A1 Oct. 6, 2005

(51) Int. Cl.
*H04L 29/06* (2006.01)

(52) U.S. Cl.
USPC ........................................ 726/8; 726/6; 726/7

(58) Field of Classification Search
USPC ...................................................... 726/6, 8, 9
See application file for complete search history.

(56) References Cited

U.S. PATENT DOCUMENTS

| | | | | |
|---|---|---|---|---|
| 6,959,336 | B2 * | 10/2005 | Moreh et al. | 709/229 |
| 6,981,043 | B2 * | 12/2005 | Botz et al. | 709/225 |
| 7,072,898 | B2 * | 7/2006 | Bussler et al. | 707/101 |
| 7,428,750 | B1 * | 9/2008 | Dunn et al. | 726/8 |
| 2002/0112155 | A1 | 8/2002 | Martherus et al. | |
| 2002/0129024 | A1 | 9/2002 | Lee | |
| 2002/0143909 | A1 | 10/2002 | Botz et al. | |
| 2002/0147746 | A1 | 10/2002 | Lee | |
| 2002/0147813 | A1 | 10/2002 | Teng et al. | |
| 2003/0097574 | A1 | 5/2003 | Upton | |
| 2003/0177388 | A1 | 9/2003 | Botz et al. | |
| 2005/0044197 | A1 * | 2/2005 | Lai | 709/223 |
| 2009/0241166 | A1 * | 9/2009 | Thurm et al. | 726/1 |

OTHER PUBLICATIONS

De Capitani di Vimercati et al., "Access Control in Federated Systems," Proceedings of the 1996 Workshop on New Security Paradigms, 1996, pp. 87-99, ACM Press, NY.*

* cited by examiner

*Primary Examiner* — Kaveh Abrishamkar
(74) *Attorney, Agent, or Firm* — Jeffrey S. LaBaw; Biggers & Ohanian, LLP

(57) ABSTRACT

Methods, systems, and computer program products are provided for cross domain security information conversion. Embodiments include receiving from a system entity, in a security service, security information in a native format of a first security domain regarding a system entity having an identity in at least one security domain; translating the security information to a canonical format for security information; transforming the security information in the canonical format using a predefined mapping from the first security domain to a second security domain; translating the transformed security information in the canonical format to a native format of the second security domain; and returning to the system entity the security information in the native format of the second security domain.

28 Claims, 3 Drawing Sheets

CROSS DOMAIN SECURITY INFORMATION CONVERSION

BACKGROUND OF THE INVENTION

1. Field of the Invention

The field of the invention is data processing, or, more specifically, methods, systems, and products for cross domain security information conversion.

2. Description of Related Art

A "federation" is a collection of security domains that have established trust. The level of trust may vary, but typically includes authentication and may include authorization, message integrity, message privacy, and other aspects of computer security. Examples of federation security protocols include WS-Federation, developed by IBM Corporation and Microsoft Corporation, and SAML, the Security Assertion Markup Language, developed by OASIS, the Organization for the Advancement of Structured Information Standards.

Entities within a federation often gain access to resources in a first domain using security information in a native format for the first domain (such as for example SAML), but to gain access to resources in a second domain, the requesting entity often must provide security information in a native format for the second domain (such as for example WS-Federation). Existing federation protocols such as WS-Federation define mechanisms from translating security information between domain specific native formats. These protocols define high-level message exchanges for retrieving security information for disparate domains, but do not discuss how to perform the actual mapping.

Current cross domain security information mapping techniques do exist, but these mapping techniques have a number of drawbacks. Conventional mapping techniques often use a shared library or plug-in architecture that require administrators or developers to be trained in or have strong knowledge in a traditional programming language such as C++ or Java to create the individual security information mappings and require new mappings to be written for each new security information format introduced. Conventional mapping techniques are therefore not easily extensible. These convention mapping techniques are also inefficient. Despite the requirement for extensive programming to create the mappings, typically only a very small portion of security information data is actually needed to gain access to resource. For example, often just a user name in the proper native format is sufficient to gain access. Such mapping systems are also often poorly written and unreliable. A badly written C or C++ plug-in that raises a segmentation fault will take down the entire system. There is a need for improved cross domain security information conversion that is extensible, robust, and employs standard technologies.

SUMMARY OF THE INVENTION

Methods, systems, and computer program products are provided for cross domain security information conversion. Embodiments include receiving from a system entity, in a security service, security information in a native format of a first security domain regarding a system entity having an identity in at least one security domain; translating the security information to a canonical format for security information; transforming the security information in the canonical format using a predefined mapping from the first security domain to a second security domain; translating the transformed security information in the canonical format to a native format of the second security domain; and returning to the system entity the security information in the native format of the second security domain.

In typical embodiments of the present invention, receiving security information includes receiving a request for security information for the second security domain, wherein the request encapsulates the security information in a native format of a first security domain. In many embodiments, the system entity includes a system entity requesting access to a resource in the second security domain. In many embodiments, the system entity includes a system entity providing access to a resource in the second security domain.

In some embodiments, translating the security information in a native format of a first security domain to a canonical format is carried out through a procedural software function. In some embodiments, the native format of the first security domain is expressed in XML, the canonical format is expressed in XML, and translating the security information in a native format of a first security domain to a canonical format is carried out in dependence upon a mapping, expressed in XSL, from the native format of the first security domain to a canonical format. In some embodiments, where the canonical format is expressed in XML, the predefined mapping from the first security domain to a second security domain is expressed in XSL.

In some embodiments, translating the transformed security information in the canonical format to a native format of the second security domain is carried out through a procedural software function. In some embodiments, the second native format is expressed in XML, the canonical format is expressed in XML, and translating the transformed security information in the canonical format to a native format of the second security domain is carried out in dependence upon a predefined mapping, expressed in XSL, from the canonical format to the native format of the second security domain.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

Figure 1:
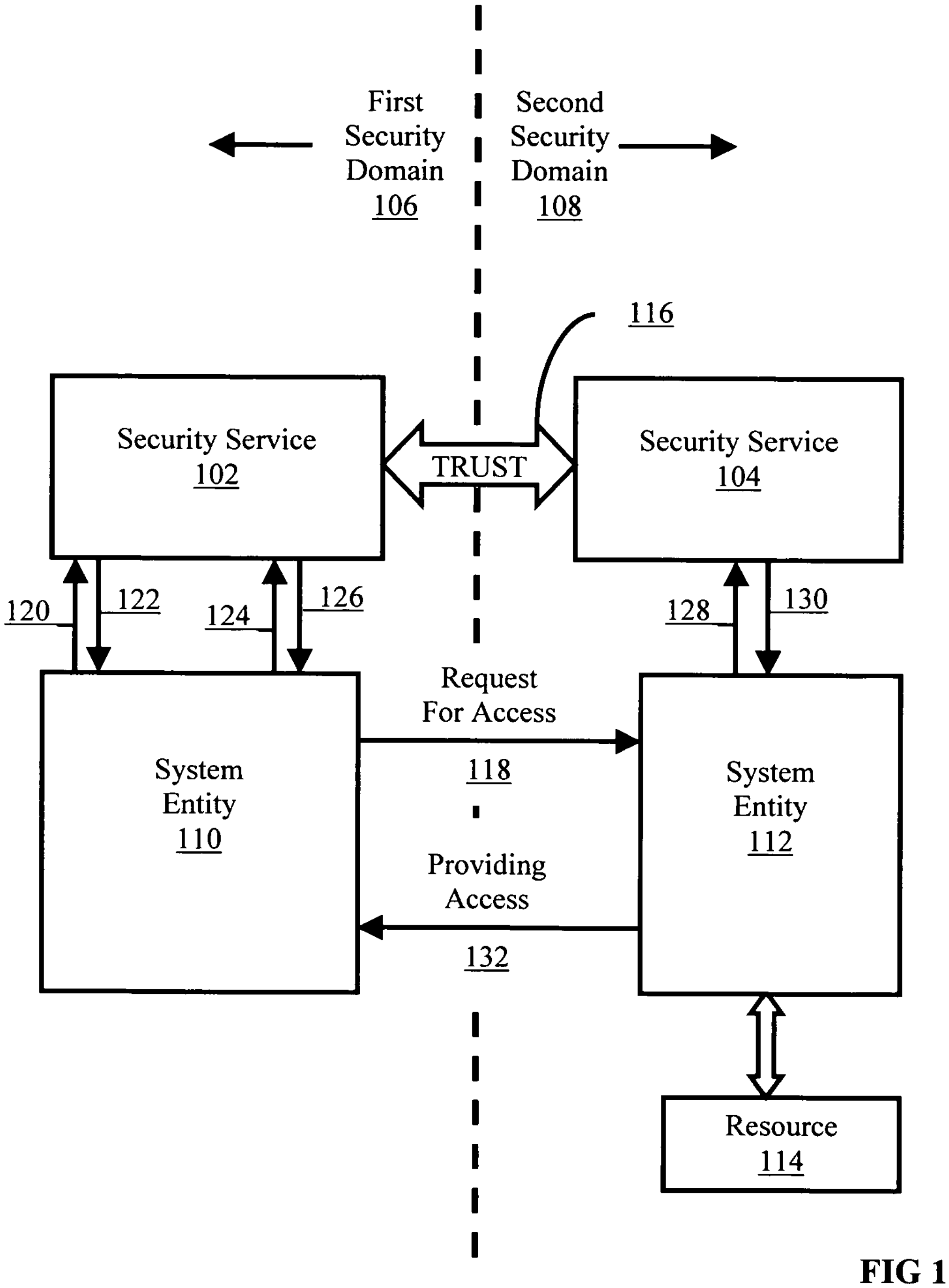
FIG. 1 sets forth a line drawing of an exemplary architecture useful in implementing cross domain security information conversion.

The present invention is described to a large extent in this specification in terms of methods for cross domain security information conversion. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

In this specification, the term "canonical" means 'conforming to orthodox or well-established rules or patterns, as of form or procedure.' In this sense, in this specification, a "canonical format" is a data format for security information that is standardized for use in data transformations of security information according to embodiments of the present invention. Depending on the security information to be transformed, the same canonical format is used generally for transformations of security information according to embodiments of the present invention.

"XML" refers to the 'eXtensible Markup Language,' a known standard for structuring data. XML is designed to provide flexible and adaptable information formatting and identification. XML is called extensible because it has no fixed format like HTML, the Hypertext Markup Language, which is a set of predefined markups. Instead, XML is actually a 'metalanguage'—a language for describing other languages—which allows users to design customized markup languages for many different types of documents. XML is not a programming language as such; it is a markup standard for structuring data.

Like HTML, XML makes use of elements, tags, and attributes. Elements are content segements identified by tags. Elements have possibly empty values, the value of an instance of an element being the string between the beginning and ending tags for the instance of the element. 'Tags' are words bracketed by '<' and '>,' and attributes are defined characteristics of elements having for example the form: AttributeName="value". While HTML specifies what each tag and attribute means, and often how the text between them will look in a browser, XML uses the tags only to delimit pieces of data, and leaves the interpretation of the data completely to the application that reads it. In other words, although in the predefined syntax of HTML, "<p>" means 'paragraph,' "<p>" in an XML file means whatever the reading application says it means. Depending on the context, it may be a price, a parameter, a person, or in many cases it represents an entity having nothing to do with Ps.

"XSL" refers to the 'Extensible Style Language,' family of recommendations for defining XML document transformation and presentation, including a language for transforming XML. XSL supports specifications or mappings allowing users or developers to transform XML documents across different applications. XSL provides the capability of specifying transformations of data and data structures, including, for example, canonical formats as well as some native security information formats, expressed in XML.

Cross Domain Security Information Conversion

Methods, systems, and computer program products for cross domain security information conversion are described herein with reference to the drawings beginning with FIG. 1. FIG. 1 sets forth a line drawing of an exemplary architecture useful in implementing cross domain security information conversion. The example of FIG. 1 includes a first security domain (106) and a second security domain (108). A security domain represents a single unit of security administration and trust. Trust is the characteristic that one system entity is willing to rely upon a second entity to execute actions or to make assertions about system entities or scopes. System entities may be any structure or function in a computer system or computer network, including users, software processes or threads of execution representing users, other software processes or threads of execution, computers, networks, system services, web services including security services, and other computer resources.

First security domain (106) and second security domain (108) establish trust (116) between security domains in accordance with one or more security federation protocols. A "federation" is a collection of security domains that have established trust. The level of trust may vary, but typically includes authentication and may include authorization, message integrity, message privacy, and other aspects of computer security. Examples of federation security protocols include WS-Federation, developed by IBM Corporation and Microsoft Corporation, and SAML, the Security Assertion Markup Language, developed by OASIS, the Organization for the Advancement of Structured Information Standards. WS-Federation includes particularly the Web Services Federation Language but also includes the related standards WS-Security, WS-Trust, and several others.

The architecture of FIG. 1 includes a security service (102) in the first security domain (106) and a security service (104) in the second security domain (108). A security service is any entity capable of issuing trusted security information. A security service generally issues security information in native format for the security domain in which it resides. An example of a security service in a WS-Federation domain is a Security Token Service or an Identity Provider. An example of a security service in a SAML domain is a SAML authority.

Security information is declarations of a security service describing security aspects of a system entity, including, for example, identity, name, password, key, group, privilege, capability, attributes, and so on. Security services issue security information in data structures fashioned for that purpose. In WS-Federation, as in many security domains, data structures issued by security services to carry security information are referred to as 'tokens,' and the security information in them is referred to as claims or assertions. In SAML domains, such data structures are referred to as 'assertions,' and the security information set forth in SAML assertions is referred to as 'statements.' In this specification, data structures fashioned to carry security information are referred to as 'tokens,' although the use of that term is for ease of explanation, not to limit the scope of the invention to domains that call security information data structures tokens.

Security services issue tokens in data formats native to each security domain. Tokens native to WS-Federation domains have a data structure or format defined in the WS-Federation standards. Tokens native to SAML domains have a data structure or format defined in the SAML standards. Tokens native to Kerberos domains have a data structure or format defined in the Kerberos standards. And so on.

In the example of FIG. 1, system entity (110) establishes trust in at least one security domain, in this example, first security domain (106), by establishing (120) a trusted identity at logon or startup with a security service for the domain, security service (102). In return, security service (102) issues (122) a security token to system entity (110). System entity (102) will request access (118) to a resource (114) located in a second security domain, in this example, second security domain (108).

There are at least two ways that a system entity (110) trusted in one domain (106) can request access (118) to a resource (114) located in a second security domain (108). One way a system entity (110) trusted in one domain (106) can request access (118) to a resource (114) located in a second security domain (108) is to transmit a request for access (118) with a security token from the first security domain (106), in which case, the system entity (112) of whom the resource is requested will send (128) to its security service (104) a request for security information for the second security domain (108) that encapsulates the security information in a native format of a first security domain (106). While the security information in the security token from the first domain remains in the native format of the first domain, it cannot be used for security decisions in the second domain. The system entity in the second domain needs its security information in the native format of the second domain. System entity (112) therefore passes (128) the security token from the first domain to its security service encapsulated in a request for a security token for the second domain.

Security service (104), according to embodiments of the present invention, receives the security information in the native format of the first security domain and converts it to the native format of the second security domain. Security service (104), upon receiving the security information, first confirms trust for system entity (110) according to one or more federation protocols on the basis of a trust relationship (116) with security service (102) in the security domain (106) where the request for access (118) originated. Security service (104) then converts the security information from system entity (110) from the native format of first security domain (106) to the native format of second security domain (108). More particularly, security service (104) translates the security information in the first native format to a canonical format, transforms the security information in the canonical format using a predefined mapping from the first security domain to a second security domain, translates the transformed security information in the canonical format to the native format of the second security domain, returns (130) to system entity (112) the security information in the native format of the second security domain (108). The security information typically is returned to the calling system entity (112) in the form of a token or assertion of the subject security domain, in this example, a token valid in the second security domain (108). Now system entity (112), having a security token for system entity (110) that is valid in the second security domain can provide access (132) to resource (114).

A second way that a system entity (110) trusted in one domain (106) can request access (118) to a resource (114) located in a second security domain (108) is to first obtain from its security service a token valid in the second domain. In such an example, system entity (110), the system entity that will request access to a resource in a domain where the requesting entity is not yet trusted, will send (124) to its security service (102) a request for security information for the second security domain (108) that encapsulates the security information in the native format of the first security domain (106). That is, system entity (110) passes (124) the security token from the first domain (106) to its security service (102) encapsulated in a request for a security token for the second domain (108).

Security service (102), according to embodiments of the present invention, receives the security information in the native format of the first security domain and converts it to the native format of the second security domain. Security service (102), upon receiving the security information, first confirms trust for system entity (110) according to one or more federation protocols on the basis of a trust relationship (116) with security service (104) in security domain (108) where the request for access (118) is directed. Security service (102) then converts the security information from system entity (110) from the native format of first security domain (106) to the native format of second security domain (108). More particularly, security service (102) translates the security information to a canonical format, transforms the security information in the canonical format using a predefined mapping from the first security domain to a second security domain, translates the transformed security information in the canonical format to the native format of the second security domain, returns (126) to system entity (110) the security information in the native format of the second security domain (108). The security information typically is returned to the calling system entity (110) in the form of a token or assertion of the target security domain, in this example, a token valid in the second security domain (108). The requesting system entity (110) then transmits a request for access (118) with a security token from the second security domain (108), and the system entity (112) provides access (132) to the resource (114) in the second domain on the basis of the trust evidenced by the security token for the second security domain.

Figure 2:
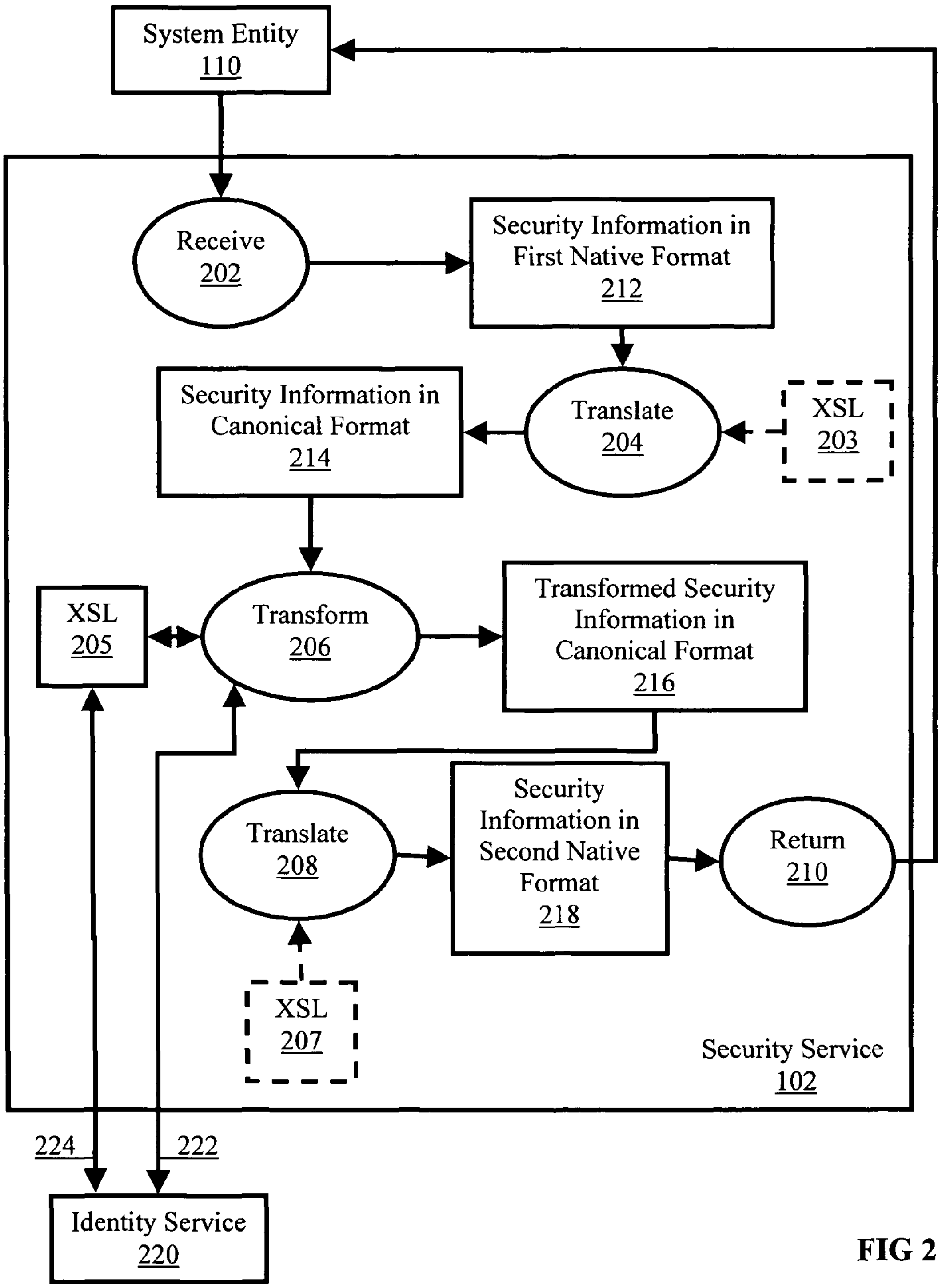
FIG. 2 sets forth a data flow diagram illustrating an exemplary method for cross domain security information conversion.

For further explanation, FIG. 2 sets forth a data flow diagram illustrating an exemplary method for cross domain security information conversion that includes receiving (202) from a system entity (110), in a security service (102), security information (212) in a native format of a first security domain regarding a system entity having an identity in at least one security domain. The following is an example, expressed as a SAML security assertion, of security information (212) in a native format of a first security domain regarding a system entity having an identity in at least one security domain:

```
<saml:Assertion
    AssertionID="34cbb5ef-00fa-ff9d-815f-b479a0895779"
    IssueInstant="2004-01-20T19:39:49Z"
    Issuer="http://ibm.com"
    MajorVersion="1"
    MinorVersion="1"
    xmlns:saml="urn:oasis:names:tc:SAML:1.0:assertion">
    <saml:Conditions NotBefore="2004-01-20T18:39:49Z"
                NotOnOrAfter="2004-01-20T20:39:49Z">
        <saml:AudienceRestrictionCondition>
            <saml:Audience>http://ibm.com</saml:Audience>
        </saml:AudienceRestrictionCondition>
    </saml:Conditions>
    <saml:AuthenticationStatement
        AuthenticationInstant="2004-01-20T19:39:49Z"
        AuthenticationMethod="urn:oasis:names:tc:SAML:1.0:am:password">
        <saml:Subject>
            <saml:NameIdentifier Format="urn:oasis:names:tc:SAML:1.1:
            nameid-format:emailAddress">jdoe@ibm.com
            </saml:NameIdentifier>
        </saml:Subject>
    </saml:AuthenticationStatement>
    <saml:AttributeStatement>
        <saml:Subject>
            <saml:NameIdentifier
                Format="urn:oasis:names:tc:SAML:1.1:nameid-
                format:emailAddress">
                jdoe@ibm.com
            </saml:NameIdentifier>
        </saml:Subject>
        <saml:Attribute AttributeName="commonName"
            AttributeNamespace="http://ibm.com/commonName">
            <saml:AttributeValue>Jon Doe</saml:AttributeValue>
        </saml:Attribute>
        <saml:Attribute AttributeName="ssn"
            AttributeNamespace="http://ibm.com/namevalue">
            <saml:AttributeValue>123-45-6789</saml:AttributeValue>
        </saml:Attribute>
        <saml:Attribute AttributeName="role"
            AttributeNamespace="http://ibm.com/role">
            <saml:AttributeValue>employee</saml:AttributeValue>
        </saml:Attribute>
    </saml:AttributeStatement>
</saml:Assertion>
```

In the exemplary SAML security assertion, SAML is the native format of a first security domain. The security information stated in the assertion is security information for a system entity identified as "jdoe@ibm.com" having the common name "Jon Doe," social security number 123-45-6789, and the role "employee." The example SAML assertion includes security information issued by a security service identified as Issuer="http://ibm.com."

Figure 3:
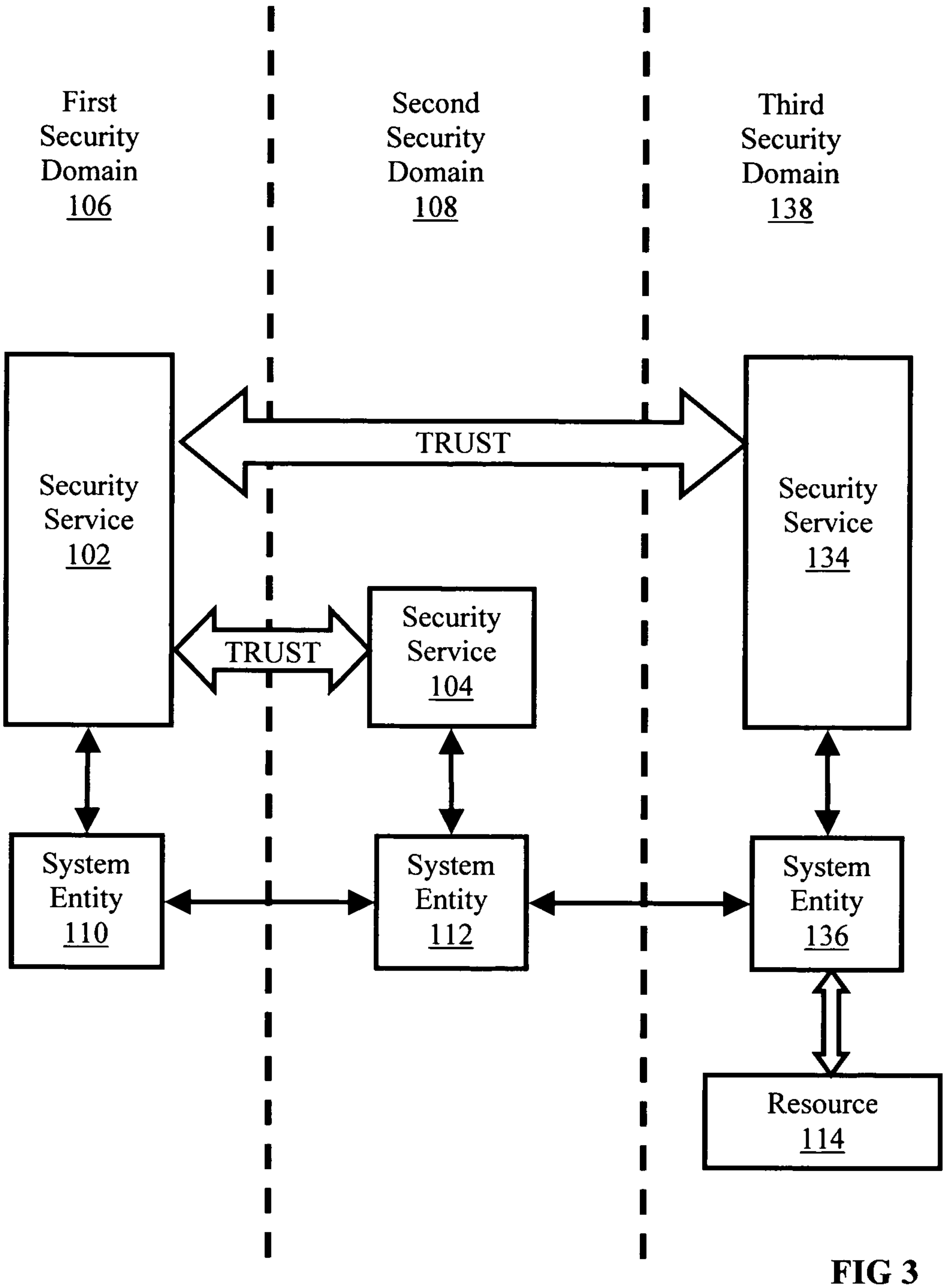
FIG. 3 sets forth a line drawing of an exemplary architecture useful in implementing cross domain security information conversion according to various embodiments of the present invention in which a system entity requesting access to a resource has no trusted identity in the security domain from which a request for access originates.

In the example of FIG. 1, the requesting system entity (110) had a security identity trusted in security domain (106), the same security domain from which the request for access to a resource originated. There is no requirement in the present invention, however, that a system entity requesting access to a resource must have a trusted identity in the security domain from which a request for access originates. For further explanation, FIG. 3 sets forth a line drawing of an exemplary architecture useful in implementing cross domain security information conversion according to various embodiments of the present invention in which a system entity requesting access to a resource has no trusted identity in the security domain from which a request for access originates. More particularly, in the example of FIG. 3, system entity (110), trusted in first security domain (106) may issue a request for access through intermediary system entity (112) in second security domain (108) for a resource located in third security domain (138). From the point of view of system entity (136), the request for access originated in second security domain (108), which is untrusted in third security domain (138). System entity (136) in third security domain (138) therefore authenticates system entity (110) directly with security service (102) in first security domain whom third security domain does trust. This is why security information (212 in FIG. 2) is security information regarding a system entity having an identity in at least one security domain. That is, for example, a requesting system entity may be trusted in a first domain and issue a request for access to a resource in a third domain through an intermediary, a delegate or a proxy, in an untrusted second domain, so that the requesting entity's ability to gain access to the resource will depend upon the third domain's ability to confirm trust with the first domain.

Continuing with reference to FIG. 2: The method of FIG. 2 includes translating (204) the security information (214) to a canonical format for security information. Any XML document is part of a set of XML documents that are logically equivalent within an application context, but which vary in physical representation based on syntactic changes permitted by XML standards. "Canonical XML, Version 1.0," an official Recommendation of the XML standards organization, the World Wide Web Consortium (W3C"), describes a method for generating a physical representation, called the "canonical form," of an XML document that accounts for such permissible changes. Generally in the meaning of "Canonical XML," if two XML documents have the same canonical form, then the two documents are logically equivalent within the given application context. The meaning of "canonical" in this specification, however, is not limited to the W3C definition. In this specification, the term "canonical" means 'conforming to orthodox or well-established rules or patterns, as of form or procedure.' In this sense, in this specification, a "canonical format" is a data format for security information that is standardized for use in data transformations of security information according to embodiments of the present invention. Depending on the security information to be transformed, the same canonical format is used generally for transformations of security information according to embodiments of the present invention. The following is an example, expressed in XML, of a canonical format for security information:

```
<stsuuser:STSUniversalUser xmlns:stsuuser="urn:ibm:names:ITFIM:1.0:stsuuser"
version="1.0">
    <stsuuser:Principal>
        <stsuuser:Attribute name="NameIdentifier"
        type="urn:oasis:names:tc:SAML:1.1:nameid-format:emailAddress">
            <stsuuser:Value>__________</stsuuser:Value>
        </stsuuser:Attribute>
    </stsuuser:Principal>
    <stsuuser:AttributeList>
        <stsuuser:Attribute name="Issuer"
        type="urn:oasis:names:tc:SAML:1.0:assertion">
            <stsuuser:Value>__________</stsuuser:Value>
        </stsuuser:Attribute>
        <stsuuser:Attribute name="ConditionsNotBefore"
        type="urn:oasis:names:tc:SAML:1.0:assertion">
            <stsuuser:Value>__________</stsuuser:Value>
        </stsuuser:Attribute>
        <stsuuser:Attribute name="ConditionsNotOnOrAfter"
        type="urn:oasis:names:tc:SAML:1.0:assertion">
            <stsuuser:Value>__________</stsuuser:Value>
        </stsuuser:Attribute>
        <stsuuser:Attributename="commonName"
        type="http://ibm.com/commonName">
            <stsuuser:Value>__________</stsuuser:Value>
        </stsuuser:Attribute>
        <stsuuser:Attribute name="ssn" type="http://ibm.com/namevalue">
            <stsuuser:Value>__________</stsuuser:Value>
        </stsuuser:Attribute>
        <stsuuser:Attribute name="role" type="http://ibm.com/role">
            <stsuuser:Value>__________</stsuuser:Value>
        </stsuuser:Attribute>
    </stsuuser:AttributeList>
</stsuuser:STSUniversalUser>
```

In this example, <stsuuser:Principal> represents a system entity whose identity can be authenticated, and the <stsuuser:Attribute> elements in <stsuuser:AttributeList> are security information, security characteristics of a system entity. In this example, the security information in canonical format includes an identification of an "Issuer" security system that issued the security information, a time period during which the security information is valid, a common name for the system entity, a social security number for the system entity, and a role for the system entity. Clearly, not all system entities will have social security numbers, but a canonical format advantageously is general.

In the method of FIG. 2, translating (204) the security information in a native format of a first security domain to a canonical format (214) may be carried out through a procedural software function written in C, C++, Java, or some other procedural language, for example. Alternatively, if the native format of the first security domain is expressed in XML and the canonical format is expressed in XML, then translating (204) the security information in a native format of a first security domain to a canonical format (214) may be carried out in dependence upon a mapping expressed in XSL, from the native format of the first security domain to a canonical format.

Taking the exemplary SAML assertion set forth above as security information in a native format of a first security domain and using the exemplary canonical format set forth above, translating (204) the security information in a native format of a first security domain to a canonical format (214) yields the following example of security information in a canonical format:

```
<stsuuser:STSUniversalUser xmlns:stsuuser="urn:ibm:names:ITFIM:1.0:stsuuser"
version="1.0">
    <stsuuser:Principal>
        <stsuuser:Attribute name="NameIdentifier"
        type="urn:oasis:names:tc:SAML:1.1:nameid-format:emailAddress">
            <stsuuser:Value>jdoe@ibm.com</stsuuser:Value>
        </stsuuser:Attribute>
    </stsuuser:Principal>
    <stsuuser:AttributeList>
        <stsuuser:Attribute name="Issuer"
        type="urn:oasis:names:tc:SAML:1.0:assertion">
            <stsuuser:Value>http://ibm.com</stsuuser:Value>
        </stsuuser:Attribute>
        <stsuuser:Attribute name="ConditionsNotBefore"
        type="urn:oasis:names:tc:SAML:1.0:assertion">
            <stsuuser:Value>2004-01-20T18:39:49Z</stsuuser:Value>
        </stsuuser:Attribute>
        <stsuuser:Attribute name="ConditionsNotOnOrAfter"
        type="urn:oasis:names:tc:SAML:1.0:assertion">
            <stsuuser:Value>2004-01-20T20:39:49Z</stsuuser:Value>
        </stsuuser:Attribute>
        <stsuuser:Attribute name="commonName"
        type="http://ibm.com/commonName">
            <stsuuser:Value>JonDoe</stsuuser:Value>
        </stsuuser:Attribute>
        <stsuuser:Attribute name="ssn" type="http://ibm.com/namevalue">
            <stsuuser:Value>123-45-6789</stsuuser:Value>
        </stsuuser:Attribute>
        <stsuuser:Attribute name="role" type="http://ibm.com/role">
            <stsuuser:Value>employee</stsuuser:Value>
        </stsuuser:Attribute>
    </stsuuser:AttributeList>
</stsuuser:STSUniversalUser>
```

The method of FIG. 2 also includes transforming (206) the security information (214) in the canonical format using a predefined mapping from the first security domain to a second security domain. Transforming (206) the security information (214) in the canonical format includes transforming the data structure, the element names and element data types, of security information in canonical form as well as data values expressed in canonical form, including system entity identities. Both structural transformation and value transformation may be carried out in dependence upon both transformation rules for structure and business rules. Both the structural rules and the business rules may be expressed in XSL (205). In the method of FIG. 2, the canonical format is expressed in XML, and the predefined mapping (205) from the first security domain to a second security domain is expressed in XSL. The following are three examples of predefined mappings from a first security domain to a second security domain expressed in XSL. The first example maps a SAML NameIdentifier of a first security domain to a Username type of a second security domain:

```
<xsl:transform version="1.0"
xmlns:xsl="http://www.w3.org/1999/XSL/Transform"
xmlns:stsuuser="urn:ibm:names:ITFIM:1.0:stsuuser">
    <xsl:strip-space elements="*" />
    <xsl:output method="xml" version="1.0"
    encoding="utf-8" indent="yes" />
    <xsl:template match="@* | node( )">
        <xsl:copy>
            <xsl:apply-templates select="@* | node( )" />
        </xsl:copy>
    </xsl:template>
    <xsl:template
    match="//stsuuser:Principal/stsuuser:Attribute[@name=
            'NameIdentifier'][@type= urn:oasis:names:tc:SAML:1.1:
            nameid-format:emailAddress']">
        <stsuuser:Attribute name="Usemame"
            type="http://somecompany.com/username">
            <stsuuser:Value><xsl:value-of select="stsuuser:Value"/>
            </stsuuser:Value>
        </stsuuser:Attribute>
    </xsl:template>
</xsl:transform>
```

The second example maps an IBM role from a first security domain to a SomeCompany role of a second security domain and sets its value to "ibm_employee":

```
<xsl:transform version="1.0" xmlns:xsl="http://www.w3.org/1999/XSL/Transform"
xmlns:stsuuser="urn:ibm:names:ITFIM:1.0:stsuuser">
    <xsl:strip-space elements="*"/>
    <xsl:output method="xml" version="1.0" encoding="utf-8" indent="yes" />
    <xsl:template match="@* | node( )">
        <xsl:copy>
            <xsl:apply-templates select="@* | node( )" />
        </xsl:copy>
    </xsl:template>
```

-continued

```
    <xsl:template
    match="//stsuuser:AttributeList/stsuuser:Attribute[@name='role'][@type='htt
    p://ibm.com/role'][stsuuser:Value='employee']">
        <stsuuser:Attribute name="Role"
        type-"http://somecompany.com/role">
            <stsuuser:Value>ibm_employee</stsuuser:Value>
        </stsuuser:Attribute>
    </xsl:template>
</xsl:transform>
```

The third example maps an IBM ssn attribute of a first security domain to SomeCompany's specific SocialSecurityNumber attribute of a second security domain:

```
<xsl:transform version="1.0"xmlns:xsl="http://www.w3.org/1999/XSL/Transform"
xmlns:stsuuser="urn:ibm:names:ITFIM:1.0:stsuuser">
    <xsl:strip-space elements="*" />
    <xsl:output method="xml" version="1.0" encoding="utf-8" indent="yes" />
    <xsl:template match="@* | node( )">
        <xsl:copy>
            <xsl:apply-templates select="@* | node( )" />
        </xsl:copy>
    </xsl:template>
    <xsl:template
    match="//stsuuser:AttributeList/stsuuser:Attribute[@name='ssn'][@type='http
    ://ibm.com/namevalue']">
        <stsuuser:Attribute name="SocialSecurityNumber"
        type="http://somecompany.com/ssn">
            <stsuuser:Value>
                <xsl:value-of select="stsuuser:Value"/>
            </stsuuser:Value>
        </stsuuser:Attribute>
    </xsl:template>
</xsl:transform>
```

Transforming (206) the security information (214) in the canonical format set forth above using the predefined mappings from the first security domain to a second security domain set forth just above results in the following exemplary transformed security information:

```
<stsuuser:STSUniversalUser xmlns:stsuuser="urn:ibm:names:ITFIM:1.0:stsuuser"
version="1.0">
    <stsuuser:Principal>
        <stsuuser:Attribute name="Username"
        type="urn:oasis:names:tc:SAML:1.1:nameid-format:emailAddress">
            <stsuuser:Value>jdoe@ibm.com</stsuuser:Value>
        </stsuuser:Attribute>
    </stsuuser:Principal>
    <stsuuser:AttributeList>
        <stsuuser:Attribute name="Issuer"
        type="urn:oasis:names:tc:SAML:1.0:assertion">
            <stsuuser:Value>http://ibm.com</stsuuser:Value>
        </stsuuser:Attribute>
        <stsuuser:Attribute name="ConditionsNotBefore"
        type="urn:oasis:names:tc:SAML:1.0:assertion">
            <stsuuser:Value>2004-01-20T18:39:49Z</stsuuser:Value>
        </stsuuser:Attribute>
        <stsuuser:Attribute name="ConditionsNotOnOrAfter"
        type="urn:oasis:names:tc:SAML:1.0:assertion">
            <stsuuser:Value>2004-01-20T20:39:49Z</stsuuser:Value>
        </stsuuser:Attribute>
        <stsuuser:Attribute name="commonName"
        type="http://ibm.com/commonName">
            <stsuuser:Value>Jon Doe</stsuuser:Value>
        </stsuuser:Attribute>
        <stsuuser:Attribute name="SocialSecurityNumber"
        type="http://ibm.com/namevalue">
            <stsuuser:Value>123-45-6789</stsuuser:Value>
        </stsuuser:Attribute>
        <stsuuser:Attribute name="SomeCompanyRole"
        type="http://ibm.com/role">
            <stsuuser:Value>ibm_employee</stsuuser:Value>
        </stsuuser:Attribute>
    </stsuuser:AttributeList>
</stsuuser:STSUniversalUser>
```

In this example, by comparison with the untransformed security information in canonical format set forth above, the <stsuuser:Attribute> name attribute value "NameIdentifer" is transformed to "UserName," the <stsuuser:Attribute> name attribute value "ssn" is transformed to "SocialSecurityNumber," the <stsuuser:Attribute> name attribute value "role" is transformed to "SomeCompanyRole," and the role value is transformed from "employee" to "ibm_employee."

The transformation function (206) according to embodiments of the present invention advantageously maps not only token formats but identities also. That is, for example, a system entity such as a user may have the identity 'bob' in a first security domain that maps to the identity 'joe' in a second security domain. All identities in a first security domain may map, to the identity 'guest' in a second security domain. And so on. Identity mappings may be included in map (205) by predefinition, that is, inserted by system administrators, security administrators, or other users authorized to do so. Alternatively, URLs pointing (224) to one or more identity services (220) may be included in XSL map (205). XSL transformation (205,206) advantageously also allows invoking methods defined in other languages such as Java, C, or C++ if additional processing, such as identity mapping (222) or an authorization check, is needed. The use of an identity service (220) also supports single-sign-ons through the use of identities mapped to a single pseudonym that may be equally trusted in many security domains.

The method of FIG. 2 also includes translating (208) the transformed security information (216) in the canonical format to a native format of the second security domain. In the method of FIG. 2, translating (208) the transformed security information in the canonical format to a native format of the second security domain may be carried out through a procedural software function written in C, C++, Java, or some other procedural language, for example. Alternatively, if the second native format is expressed in XML and the canonical format is expressed in XML, then translating (208) the transformed security information in the canonical format to a native format of the second security domain may be carried out in dependence upon a predefined mapping expressed in XSL, from the canonical format to the native format of the second security domain. The method of FIG. 2 also includes returning (210) to the system entity the security information (218) in the native format of the second security domain. The output token maybe any format, the following example is a custom token for, for example, a security domain of 'SomeCompany,' that illustrates the overall security information conversion if all the rules described above were executed:

```
<UsernameToken>
    <Username>jdoe@ibm.com</Username>
    <Role>ibm_employee</Role>
    <SocialSecurityNumber>123-45-67893</SocialSecurityNumber>
</UsernameToken>
```

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method for cross domain security information conversion, the computer comprising a computer processor and a computer memory operatively coupled to the computer processor, the computer memory having disposed within it computer program instructions that execute the method, the method comprising:

receiving from a system entity, in a security service, security information in a native format of a first security domain regarding a system entity having an identity in at least one security domain, wherein the system entity comprises automated computing machinery;

translating the security information to a canonical format for security information, wherein the canonical format is a data format for security information that is standardized for use in data transformations of security information;

transforming the security information in the canonical format using a predefined mapping from the first security domain to a second security domain;

translating the transformed security information in the canonical format to a native format of the second security domain; and returning to the system entity the security information in the native format of the second security domain.

2. The method of claim 1 wherein transforming the security information includes structure transformation and value transformation, including mapping a system entity's identity in the first security domain to a another identity in the second security domain.

3. The method of claim 1 wherein receiving security information further comprises receiving a request for security information for the second security domain, wherein the request encapsulates the security information in a native format of a first security domain.

4. The method of claim 3 wherein the system entity comprises a system entity requesting access to a resource in the second security domain.

5. The method of claim 3 wherein the system entity comprises a system entity providing access to a resource in the second security domain.

6. The method of claim l wherein translating the security information in a native format of a first security domain to a canonical format is carried out through a procedural software function.

7. The method of claim 1 wherein the native format of the first security domain is expressed in XML, the canonical format is expressed in XML, and translating the security information in a native format of a first security domain to a canonical format is carried out in dependence upon a mapping, expressed in XSL, from the native format of the first security domain to a canonical format.

8. The method of claim 1 wherein the canonical format is expressed in XML and the predefined mapping from the first security domain to a second security domain is expressed in XSL.

9. The method of claim 1 wherein the second native format is expressed in XML, the canonical format is expressed in XML, and translating the transformed security information in the canonical format to a native format of the second security domain is carried out in dependence upon a predefined mapping, expressed in XSL, from the canonical format to the native format of the second security domain.

10. A system for cross domain security information conversion, the system comprising a computer processor operatively coupled to a computer memory. the computer memory having disposed within it computer program instructions for:

receiving from a system entity, in a security service, security information in a native format of a first security domain regarding a system entity having an identity in at least one security domain;

translating the security information to a canonical format for security information;

transforming the security information in the canonical format using a predefined mapping from the first security domain to a second security domain;

translating the transformed security information in the canonical format to a native format of the second security domain; and returning to the system entity the security information in the native format of the second security domain.

11. The system of claim 10 wherein transforming the security information includes structure transformation and value transformation, including mapping a system entity's identity in the first security domain to a another identity in the second security domain.

12. The system of claim 10 wherein receiving security information further comprises receiving a request for security information for the second security domain, wherein the request encapsulates the security information in a native format of a first security domain.

13. The system of claim 12 wherein the system entity comprises a system entity requesting access to a resource in the second security domain.

14. The system of claim 12 wherein the system entity comprises a system entity providing access to a resource in the second security domain.

15. The system of claim 10 wherein translating the security information in a native format of a first security domain to a canonical format comprises a procedural software function.

16. The system of claim 10 wherein translating the security information in a native format of a first security domain to a canonical format comprises a mapping, expressed in XSL, from the native format of the first security domain to a canonical format.

17. The system of claim 10 wherein the canonical format is expressed in XML and the predefined mapping from the first security domain to a second security domain is expressed in XSL.

18. The system of claim 10 wherein the second native format is expressed in XML, the canonical format is expressed in XML, and translating the transformed security information in the canonical format to a native format of the second security domain comprises a predefined mapping, expressed in XSL, from the canonical format to the native format of the second security domain.

19. A computer program product for cross domain security information conversion, the computer program product embodied on a recordable computer-readable medium, the computer program product comprising computer program instructions which when installed and executed on a data processing system, are capable causing the data processing system to carry out the steps of:

receiving from system entity, in a security service, security information in a native format of a first security domain regarding a system entity having an identity in at least one security domain, wherein the system entity comprises automated computing machinery translating the security information to a canonical format for security information;

transforming the security information in the canonical format using a predefined mapping from the first security domain to a second security domain;

translating the transformed security information in the canonical format to a native format of the second security domain; and returning to the system entity the security information in the native format of the second security domain.

20. The computer program product of claim 19 wherein computerprogram instructions for transforming the security information includes computerprogram instructions for structure transformation and value transformation, including computer program instructions for mapping a system entity's identity in the first security domain to another identity in the second security domain.

21. The computer program product of claim 19 wherein computer program instructions for receiving security information further comprises computer program instructions for receiving a request for security information for the second security domain, wherein the request encapsulates the security information in a native format of a first security domain.

22. The computer program product of claim 21 wherein the system entity comprises a system entity requesting access to a resource in the second security domain.

23. The computer program product of claim 21 wherein the system entity comprises a system entity providing access to a resource in the second security domain.

24. The computer program product of claim 19 wherein computer program instructions for translating the security information in a native format of a first security domain to a canonical format comprises a procedural software function.

25. The computer program product of claim 19 wherein computer program instructions for translating the security information in a native format of a first security domain to a canonical format comprises a mapping, expressed in XSL, from the native format of the first security domain to a canonical format.

26. The computer program product of claim 19 wherein the canonical format is expressed in XML and the predefined mapping from the first security domain to a second security domain is expressed in XSL.

27. The computer program product of claim 19 wherein computer program instructions for translating the transformed security information in the canonical format to a native format of the second security domain comprises a procedural software function.

28. The computer program product of claim 19 wherein the second native format is expressed in XML, the canonical format is expressed in XML, and computer program instructions for translating the transformed security information in the canonical format to a native format of the second security domain comprises a predefined mapping, expressed in XSL, from the canonical format to the native format of the second security domain.

* * * * *